Feb. 22, 1966 R. B. HANSEN ETAL 3,236,946

TRANSISTOR NOISE GATE WITH NOISE CANCELLATION BY COLLECTOR TO BASE SIGNAL CONDUCTOR

Filed March 15, 1963

INVENTORS
Robert B. Hansen
Anil M. Sethna
BY Mueller & Aichele
Attys.

United States Patent Office 3,236,946

Patented Feb. 22, 1966

3,236,946

TRANSISTOR NOISE GATE WITH NOISE CANCELLATION BY COLLECTOR TO BASE SIGNAL CONDUCTOR

Robert B. Hansen, Arlington Heights, and Anil M. Sethna, Chicago, Ill., assignors to Motorola, Inc., Chicago, Ill., a corporation of Illinois Filed Mar. 15, 1963, Ser. No. 265,452
8 Claims. (Cl. 178—7.3)

The present invention relates to automatic gain control circuits and more particularly to an automatic gain control circuit especially suitable for use in television receivers.

Gated automatic gain control circuits are commonly used in present day television receivers to provide a gain control signal which is proportional to the average level of the synchronizing signal component of the detected composite video signal. This provides a gain control signal which does not vary as a function of the direct current or brightness component of the scene being televised. In such a system the automatic gain control (AGC) circuit is periodically gated to sample the detected composite video signal only at such times as the synchronizing signal component is present. In a transistorized television receiver this may be accomplished by providing a gating transistor which is supplied with an input signal from a video amplifier stage of the receiver, and which is normally biased to cutoff when the video signal component of the composite video signal is present. A gating or keying pulse derived from the horizontal sweep circuit of the receiver periodically drives the gating transistor into conduction so that it charges a resistance-capacitance (RC) network to a level which is proportional to the level of synchronizing signals appearing at its input in time coincidence with the gating pulse.

Noise impulses accompanying the composite video signal which exceed the maximum level of the synchronizing signal component of the composite video signal tend to cause noise charge-up of the RC network of the AGC circuit. High level noise impulses accompanying the video portion of the composite video signal may cause instantaneous conduction of the gating transistor to charge the RC network in the interval between synchronizing signals, while noise impulses accompanying the synchronizing signal portion of the composite video signal will result in increased conduction to excessively charge the RC network. In addition, the presence of noise impulses at the input of the gating transistor will increase leakage current when it is in a normally cutoff condition so that the average AGC level is adversely affected.

It is therefore among the objects of the present invention to provide an improved gated automatic gain control circuit for use with transistorized television receivers.

Another object is to provide a simple and effective automatic gain control gating circuit in which the adverse effects of high level noise impulses are eliminated.

A further object is to provide a gated automatic gain control circuit for use in transistorized television receivers in which means are provided to effectively cancel high level noise impulses from the input thereof.

A feature of the present invention is the provision of a gated automatic gain control circuit in which noise cancelling impulses are coupled through the collector-to-base diode of the noise gate transistor to provide cancellation of impulse noise appearing at the input electrode thereof.

Another feature is the provision of circuit means to provide a noise cancelling pulse at the output electrode of the noise gate transistor in a gated automatic gain control circuit, which noise cancelling pulse is of a magnitude and polarity to cause reverse conduction between its output and input electrodes so that noise impulses are effectively cancelled from the input electrode thereof.

A further feature is the provision of a gated automatic gain control circuit having a transistor which is periodically gated into conduction to produce collector-to-emitter current in proportion to the level of the synchronizing signal component of the detected composite video signal applied to its base electrode. A noise cancelling transistor coupled with the collector electrode of the gating transistor pulses its collector electrode to the level of its emitter electrode in the presence of high level noise impulses accompanying the composite video signal, resulting in collector-to-base conduction of the gating transistor so that noise impulses are effectively cancelled at its base electrode.

Still another feature is the provision, in a circuit of the above-described type, of means in the output circuit of the noise gating transistor to develop a D.C. voltage proportional to leakage conduction and of a polarity which tends to compensate for shifts in the D.C. level of the noise gating transistor as a result of noise appearing at its input electrode.

Other objects, features and attending advantages of the invention will become apparent from the following description whe ntaken in conjunction with the accompanying drawings, in which.

Figures 1, 2, 3:
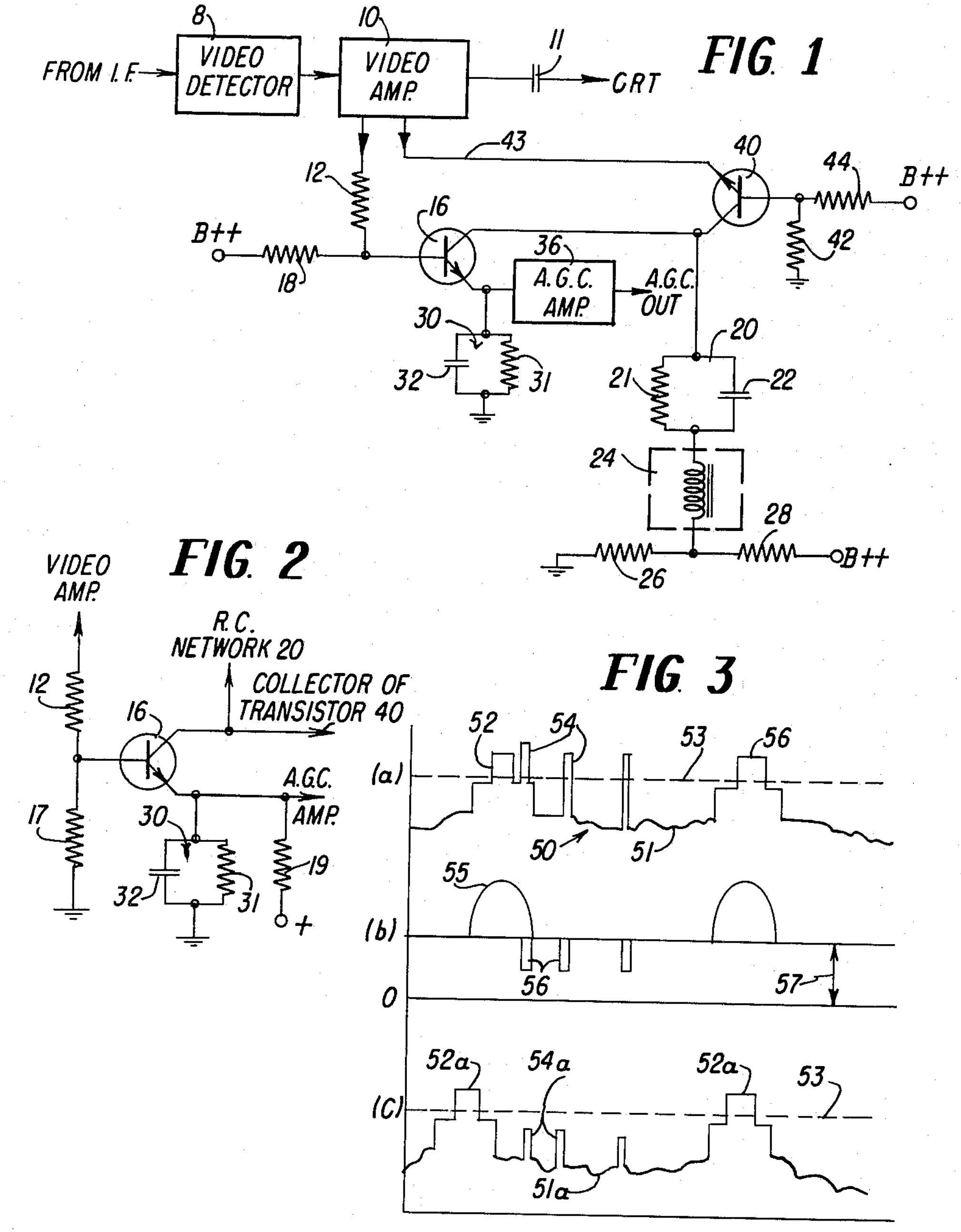
FIG. 1 is a diagram, partly in schematic and partly in block form, showing a television receiver incorporating one form of the invention.
FIG. 2 is a diagram showing a modification of the circuit of FIG. 1.

FIGS. 3*a*–3*c* illustrate a series of waveforms useful in understanding the invention.

In practicing the invention there is provided an AGC noise gate transistor which is periodically gated to conduction by voltage pulses coupled to its collector electrode from a winding on the horizontal output transformer of the receiver. The base or input electrode of the gating transistor is coupled to a video amplifier stage of the receiver by a biasing network which allows the transistor to conduct only in the presence of the synchronizing signal component of the detected composite video signal. Conduction of the gating transistor is controlled by the level of the synchronizing signal component applied to its base electrode and accordingly an AGC voltage of a corresponding level is developed across an RC network. This AGC voltage is subsequently filtered, amplified, and distributed to gain controlled stages of the receiver.

A noise cancelling transistor is provided in the common base configuration, with its collector or output electrode direct current coupled to the collector or output electrode of the AGC gating transistor. A portion of the detected composite video signal, of a polarity opposite to that supplied to the input electrode of the AGC gating transistor, is coupled to the input or emitter electrode of the noise cancelling transistor. Since in the common base configuration there is no phase inversion, the polarity of the signal appearing at the collector electrode of the noise cancelling transistor is the same as that of the composite video signal applied to its emitter electrode. Emitter-to-base bias for the noise cancelling transistor is adjusted so that it is in the state of cutoff in the absence of noise impulses accompanying the detected composite video signal. During the presence of noise impulses of sufficient amplitude the noise cancelling transistor conducts to provide a pulse at the collector electrode of the gating transistor. This causes the potential appearing at the collector electrode of the gating transistor to be driven towards the level of its emitter electrode, and as a result a noise cancelling impulse is coupled through its collector-to-base junction of a polarity which causes cancellation of noise impulses accompanying the composite video signal supplied to its input base electrode. There is accordingly effective cancellation of noise impulses to prevent increased conduction and noise charge-up of the AGC circuit.

There is further provided a parallel resistance-capacitance (RC) network in the collector circuit of the AGC gating transistor to develop a voltage proportional to its average D.C. leakage conduction. The polarity of this voltage is opposite to the voltage build-up in the AGC system which may result from an increase in leakage of the gating transistor due to noise accompanying the composite video signal appearing at its base electrode, and effectively prevents shifts in D.C. operating level of the AGC gating transistor as a result of such noise.

Referring now to FIG. 1, detected composite video signals derived from video detector 8 of the receiver are fed to the input of video amplifier 10 and are subsequently coupled through capacitor 11 to provide drive for the cathode ray tube of the receiver. Video amplifier 10 may contain one or more stages of video amplification, each stage of which includes a PNP or an NPN transistor. The output of a video stage, which is conventionally the collector electrode of one such transistor, is direct current connected by a voltage dividing arrangement including resistor 12 to the input base electrode of AGC gating transistor 16. It is to be understood that where PNP stages are used their collector voltage is negative with respect to ground reference potential, and where NPN stages are used in video amplifier 10 their collector voltage is positive with respect to ground reference potential. The signals thereby derived are selected to be positive going and accordingly transistor 16, an NPN transistor, will tend to conduct when they exceed a predetermined level. Where PNP stages are used in the video amplifier the base electrode of transistor 16 is further connected by resistor 18 to a source of positive potential. Resistors 12 and 18 form a voltage divider so that this positive potential, in conjunction with the potential appearing at the collector electrode in the selected video stage, establishes a base-to-emitter bias for transistor 16 such that it is normally cutoff and tends to conduct only in the presence of synchronizing signal components of the detected composite video signal.

Where NPN stages are used in video amplifier 10 it may be desirable to provide a positive emitter biasing voltage to insure that transistor 16 is maintained cutoff during the video portion of the composite video signal, as shown in FIG. 2. Resistor 17 connects the base electrode of transistor 16 to ground reference potential to form a voltage divider with resistor 12, and resistor 19 connects the emitter electrode of transistor 16 to a source of positive potential. As mentioned above, base-to-emitter bias is provided so that transistor 16 tends to conduct in the presence of synchronizing signal components of the composite video signal applied to its base electrode.

The collector electrode of transistor 16 is connected through RC network 20, which is comprised of resistor 21 and capacitor 22, to winding 24 located on the core of the horizontal output transformer of the receiver. The other end of winding 24 is connected through resistor 26 to ground reference potential. Resistor 26 forms a voltage divider with resistor 28, which is connected to a source of positive potential, to provide a positive voltage at the collector electrode of transistor 16 which is slightly above the positive signals which may appear at the base electrode of transistor 16 in the absence of the synchronizing portion of the composite video signal. This arrangement prevents base-to-collector conduction of transistor 16 during periods when high level video information signals are present at its base electrode.

The emitter electrode of transistor 16 is connected to ground reference potential through RC network 30, which is comprised of resistor 31 and capacitor 32. Conduction of transistor 16 in the presence of synchronizing signal components of the composite video signal develops a voltage across RC network 30 which is subsequently filtered and amplified by AGC amplifier 36 for distribution to gain control stages of the receiver. It is to be understood that voltage pulses are coupled to the collector electrode of transistor 16 by winding 24 at the horizontal sweep rate of the receiver (15.75 kc.) to allow transistor 16 to conduct in the presence of synchronizing signals coupled to its base electrode. The level of conduction is determined by the level of the synchronizing signals with respect to the bias established on base electrode of transistor 16. The level of the synchronizing signals is in turn proportional to the level of received signal strength. The voltage developed across RC network 30 is essentially sawtooth in form and when subsequently filtered has an average level indicative of incoming signal strength to provide AGC for the receiver.

The collector electrode of noise cancelling transistor 40 is direct current connected to the collector electrode of gating transistor 16. Transistor 40 is connected in the common base configuration and accordingly its base electrode is connected to ground reference potential through resistor 42. Detected composite video signals are supplied to the emitter electrode of trasistor 40 from video amplifier 10 on lead 43. These signals are derived from a point in video amplifier 10 to be of opposite polarity to those supplied to the base electrode of transistor 16. To this end they may be derived from the input electrode of the stage from which signals for transistor 16 are derived, or may be derived directly from the output of the video detector of the receiver. Thus where the composite video signal supplied to tranistor 16 is positive going, the composite video signal supplied on lead 43 to the emitter electrode of transistor 40 is negative going. With transistor 40 an NPN transistor as shown, a positive bias is supplied to its base electrode through resistor 44, which in conjunction with resistor 42 forms a voltage divider. The voltage at the junction point between resistors 42 and 44 is selected so that transistor 40 is biased to cutoff for composite video signals supplied to its emitter electrode which are unaccompanied by noise impulses.

In operation, negative going noise impulses appearing at the emitter electrode of transistor 40 that exceed the maximum level of the detected composite video signal cause transistor 40 to tend to conduct. Since for the common base stage there is no phase inversion, negative going impulses also appear at the collector electrode of transistor 40. Because of the direct current coupling between the collector electrode of transistor 40 and the collector electrode of transistor 16, the collector electrode of transistor 16 is driven in a negative direction in the presence of such impulses. As the potential of the collector electrode of transistor 16 approaches the level of its emitter electrode, which is essentially ground reference potential for A.C. signal components, there is conduction of the collector-to-base diode of transistor 16. This results in noise impulses being fed through to its base electrode which are of opposite polarity to the composite video signal and accompanying noise impulses which are supplied from video amplifier 10 by resistor 12 to its base electrode. Accordingly, there is partial cancellation of positive going noise impulses accompanying synchronizing signals at the base electrode of transistor 16 which tend to provide excessive charge for RC network 30. And since AGC gating transistor 16 is provided with a fixed D.C. collector voltage, it may also be gated into conduction by high level noise impulses which appear at its base electrode during the video signal component of the detected composite video signal. However, in such instance transistor 40 also conducts, and noise cancellation as described above will take place at the base electrode of transistor 16. This partial cancellation is sufficient to reduce the level of noise impulses appearing at the base electrode of transistor 16 to prevent it from being gated into conduction.

In addition, the increased average signal level at the base electrode of transistor 16 resulting from impulse noise accompanying the composite video signal will tend to increase collector-to-emitter leakage of transistor 16 between periods of gating pulses supplied from winding 24. This causes an increase in the average voltage developed across RC network 30, which results in a shift in the D.C. level of the emitter electrode of transistor 16. For a fixed base bias this D.C. emitter shift will cause a change in the conduction level of transistor 16. However, RC network 20 also develops a voltage with increased leakage of transistor 16, which voltage is proportional to but of opposite polarity to that developed across RC network 30. Thus compensation is provided for D.C. emitter shift of transistor 16 in the presence of impulse noise at its base electrode.

With reference to FIG. 3*a*, waveform 50 represents a detected composite video signal accompanied by high level noise impulses as appearing at the base electrode of transistor 16. Synchronizing signals 52 rise above video component 51 of the composite video signal, and when they exceed level 53 transistor 16 tends to conduct. It is to be noted that noise impulses 54 may also exceed the level 53, causing increased conduction when accompanying synchronizing signals 52, and gating of transistor 16 into conduction when accompanying video component 51. FIG. 3*b* represents signals appearing at the collector electrode of transistor 16. Pulses 55 are the gating or keying pulses derived from winding 24 of the horizontal output transformer of the receiver, while impulses 56, of opposite polarity, are those supplied by noise cancelling transistor 40 to the collector electrode of transistor 16. It is to be noted that the fixed voltage on the collector electrode of transistor 16 displaces the reference level for pulses 55 and 56 from zero reference by a fixed amount 57. Because of fixed voltage 57 it is possible for transistor 16 to be gated into conduction by high level noise impulses accompanying the video portion of the detected composite video signal in the absence of keying pulses 55. As shown by FIG. 3*c*, the partial cancellation provided by impulses 56 when coupled through the collector-to-base diode of transistor 16 remove noise pulses 54 from synchronizing signal 52, and further reduce the level of noise pulses 54 which occur during the video portion of the composite video signal to a level which will not result in conduction of transistor 16. Thus as shown, the actual signal appearing at the base electrode of transistor 16 includes a synchronizing signal component **52*a* which is unaccompanied by noise impulses, and a video signal component 51*a* which is accompanied by noise impulses 54*a* of an amplitude below level 53**.

In a circuit of practical construction the component values were as follows:

| | | |
|---|---|---|
| Resistor **12** | ohms | 33,000 |
| Transistors **16, 40** | (Motorola) | 4465 |
| Resistor **18** | ohms | 22,000 |
| Resistor **21** | do | 5600 |
| Capacitor **22** | picofarads | 6800 |
| Resistor **26** | ohms | 8200 |
| Resistor **28** | do | 680 |
| Resistor **31** | ohms | 10,000 |
| Capacitor **32** | microfarad | 0.01 |
| Resistor **42** | ohms | 560 |
| Resistor **44** | do | 470 |

The invention provides, therefore, an improved automatic gain control circuit for transistorized television receivers which is simple and inexpensive to construct. High level noise impulses are cancelled from the input of the AGC gating transistor so that the AGC system is not excessively charged by noise impulses accompanying the synchronizing signal point of the detected composite video signal, and so that the gating transistor is not gated to conduction by high level noise impulses occurring during the video portion of the detected composite video signal. In addition, means are provided in the collector circuit of the gating transistor to compensate for shifts in its D.C. emitter level as a result of increased collector-to-emitter leakage in the presence of noise at its input.

We claim:

1. In a television receiver having means for demodulating received waves to provide a composite video signal and amplification means for coupling said composite video signal to utilization means, an automatic gain control circuit including in combination: a gating transistor having first, second and third electrodes; means coupling the first electrode of said gating transistor to said amplification means to derive a composite video signal of a given polarity therefrom; means for applying voltage pulses at the horizontal sweep rate of said receiver to the second electrode of said gating transistor, with conduction of said gating transistor being controlled in accordance with changes in the level of the synchronizing signal component of said composite video signal; means coupled with the third electrode of said gating transistor for developing an automatic gain control voltage in response to conduction thereof; a noise cancelling transistor having first, second and third electrodes; means coupling the first electrode of said noise cancelling transistor to said amplification means to derive a composite video signal of a polarity opposite to said given polarity therefrom; means connected to the second electrode of said noise cancelling transistor to bias the same to cutoff in the presence of said composite video signal unaccompanied by noise impulses of a predetermined level; and means coupling the third electrode of said noise cancelling transistor to the second electrode of said gating transistor, with said noise cancelling transistor becoming conductive in the presence of noise impulses exceeding said predetermined level to thereby cause cancellation of corresponding noise impulses at the first electrode of said gating transistor.

2. In a television receiver having means for demodulating received waves to provide a composite video signal and amplification means for coupling said composite video signal to utilization means, an automatic gain control circuit including in combination: a gating transistor having first, second and third electrodes, means coupling the first electrode of said gating transistor to said amplification means to derive a composite video signal of a given polarity therefrom; means for applying pulses at the horizontal sweep rate of said receiver to the second electrode of said gating transistor, with conduction of said gating transistor controlled in accordance with changes in the level of the synchronizing signal component of said composite video signal; circuit means coupled to the second electrode of said gating transistor to develop a D.C. voltage of a polarity and magnitude to compensate for changes in the average level of said automatic gain control voltage resulting from increased conduction caused by noise impulses accompanying the composite video signal; a noise cancelling transistor having first, second and third electrodes; means coupling the first electrode of said noise cancelling transistor to said amplification means to derive a composite video signal of a polarity opposite to said given polarity therefrom; means connected to the second electrode of said noise cancelling transistor to bias same to cutoff in the presence of composite video signals unaccompanied by noise impulses of a predetermined level; and means coupling the third electrode of said noise cancelling transistor to the second electrode of said gating transistor, with said noise cancelling transistor becoming conductive in the presence of noise impulses exceeding said predetermined level to thereby cause cancellation of corresponding noise impulses at the first electrode of said gating transistor.

3. In a transistorized television receiver for television signals which include a video signal component and a synchronizing signal component of an amplitude exceeding the peak amplitude of the video signal component, the combination including: video detector circuit means for providing a detected composite video signal of a given polarity, which composite video signal may contain noise impulses of the same polarity; video amplification means including at least one video amplifier stage for coupling said composite video signal to utilization means; time gated transistor means having first, second and third electrodes, with the first electrode of said time gated transistor means coupled to said video amplification means to derive a composite video signal therefrom of a given polarity; means coupled to the second electrode of said time gated transistor means to periodically gate the same into conduction in time coincidence with the synchronizing signal component of said composite video signal, with the conduction of said time gated transistor means being controlled by the level of the synchronizing signal component of said composite video signal; means coupled to the third electrode of said time gated transistor for developing an automatic gain control voltage in response to conduction thereof; noise cancelling transistor means having first, second and third electrodes; means coupling the first electrode of said noise cancelling transistor to said video amplification means to derive a composite video signal therefrom of a polarity opposite to said given polarity; means connected to the second electrode of said noise cancelling transistor means to bias the same to cutoff in the presence of said composite video signal unaccompanied by noise impulses of a predetermined level, with said noise cancelling transistor becoming conductive by accompanying noise impulses exceeding said predetermined level; and means connecting the third electrode of said noise cancelling transistor means to the second electrode of said time gated transistor means whereby noise impulses exceeding said predetermined level are cancelled from the first electrode of said time gated transistor means.

4. In a transistorized television receiver for television signals which include a video signal component and a synchronizing signal component of an amplitude exceeding the peak amplitude of the video signal component, the combination including: video detector circuit means for providing a detected composite video signal of a given polarity, which composite video signal may contain noise impulses of the same polarity; video amplification means including at least one video amplifier stage for coupling said composite video signal to utilization means; a time gated transistor having base, collector and emitter electrodes, with the base electrode of said time gated transistor coupled to said video amplification means to derive a composite video signal of a given polarity therefrom; means coupled to the collector electrode of said time gated transistor to periodically gate same into conduction in time coincidence with the synchronizing signal component of said composite video signal, with the conduction of said time gated transistor being controlled by the level of the synchronizing signal component of said composite video signal; means coupled to the emitter electrode of said time gated transistor for developing an automatic gain control voltage in response to conduction thereof; a noise cancelling transistor having emitter, base and collector electrodes; means coupling the emitter electrode of said noise cancelling transistor to said video amplification means to derive a composite video signal of a polarity opposite to said given polarity therefrom; means connected to the base electrode of said noise cancelling transistor to bias same to cutoff in the presence of said composite video signal at the emitter electrode thereof unaccompanied by noise impulses exceeding a predetermined level, with noise impulses exceeding said predetermined level causing conduction of said noise cancelling transistor; and means connecting the collector electrode of said noise cancelling transistor to the collector electrode of said time gated transistor, with conduction of said noise cancelling transistor causing the level of the collector electrode of said time gated transistor to be reduced to that of its emitter electrode, whereby conduction of the collector-to-base diode of said time gated transistor causes cancellation of noise impulses at the base electrode thereof.

5. In a transistorized television receiver for television signals which include a video signal component and a synchronizing signal component of an amplitude exceeding the peak amplitude of the video signal component, the combination including: video detector circuit means for providing a detected composite video signal of a given polarity, which composite video signal may contain noise impulses of the same polarity; video amplification means including at least one video amplifier transistor for coupling said composite video signal to utilization means; an NPN time gated transistor having base, collector and emitter electrodes, with the base electrode of said time gated transistor coupled to a transistor of said video amplification means to derive a composite video signal of a positive going polarity therefrom; means coupled to the collector electrode of said time gated transistor to periodically gate the same into conduction in time coincidence with the synchronizing signal component of said composite video signal, with the conduction of said time gated transistor being controlled by the level of the synchronizing signal component of said composite video signal; means coupled to the emitter electrode of said time gated transistor for developing an automatic gain control voltage in response to conduction thereof; an NPN noise cancelling transistor having emitter, base and collector electrodes; means coupling the emitter electrode of said noise cancelling transistor to a transistor stage in said video amplification means to derive a composite video signal of a negative going polarity therefrom; means connected to the base electrode of said noise cancelling transistor to bias the same to cutoff in the presence of said composite video signal unaccompanied by noise impulses of a predetermined level, with said noise cancelling transistor being caused to conduct by noise impulses exceeding said predetermined level; and means connecting the collector electrode of said noise cancelling transistor to the collector electrode of said time gated transistor, with conduction of said noise cancelling transistor tending to cause the level of the collector electrode of said time gated transistor to be reduced to that of its emitter electrode, whereby conduction of the collector-to-base diode of said time gated transistor causes cancellation of noise impulses at the base electrode thereof.

6. In a transistorized television receiver for television signals which include a video signal component and a synchronizing signal component of an amplitude exceeding the peak amplitude of the video signal component, the combination including: video detector circuit means for providing a detected composite video signal of a given polarity, which composite video signal may contain noise impulses of the same polarity; video amplification means including at least one video amplifier stage for coupling said composite video signal to utilization means; a time gated transistor having first, second and third electrodes, with the first electrode of said time gated transistor coupled to said video amplification means to derive a composite video signal of a given polarity therefrom; means for coupling voltage pulses to the second electrode of said time gated transistor to periodically gate the same into conduction in time coincidence with the synchronizing signal component of said composite video signal, with the conduction of said time gated transistor being controlled by the level of the synchronizing signal component of said composite video signal; means coupled to the third electrode of said time gated transistor for developing an automatic grain control voltage in response to conduction thereof; means for developing a D.C. voltage of a polarity opposite to the polarity of said automatic gain control voltage at the second electrode of said time gated transistor to prevent a shift in the average voltage level of its third electrode by increased conduction resulting from noise impulses accompanying the composite video signal applied to its first electrode; a noise cancelling transistor having first, second and third electrodes; means coupling the first electrode of said noise cancelling transistor to said video amplification means to derive a composite video signal of a polarity opposite to said given polarity therefrom; means connected to the second electrode of said noise cancelling transistor to bias the same to cutoff in the presence of said composite video signal unaccompanied by noise impulses of a predetermined level, with noise impulses exceeding said predetermined level causing conduction of said noise cancelling transistor; and means connecting the third electrode of said noise cancelling transistor to the second electrode of said time gated transistor, whereby noise impulses exceeding said predetermined level are cancelled from the first electrode of said time gated transistor.

7. In a transistorized television receiver for television signals which include a video signal component and a synchronizing signal component of an amplitude exceeding the peak amplitude of the video signal component, the combination including: video detector circuit means for providing a detected composite video signal of a given polarity, which composite video signal may contain noise impulses of the same polarity; video amplification means including at least one video amplification stage for coupling said composite video signal to utilization means; a time gated transistor having base, collector and emitter electrodes, with the base electrode of said time gated transistor coupled to said video amplification means to derive a composite video signal of a given polarity therefrom; means for developing voltage pulses at the horizontal sweep rate of said receiver; means for coupling said voltage pulses to the collector electrode of said time gated transistor means to periodically gate the same into conduction, with the conduction of said time gated transistor being controlled by the level of the synchronizing signal component of said composite video signal, means coupled to the emitter electrode of said time gated transistor for developing an automatic gain control voltage in response to conduction thereof; means including a resistance-capacitance network connected between the means developing said voltage pulses and the collector electrode of said time gated transistor, with said resistance-capacitance network developing a D.C. voltage of a polarity opposite to said automatic gain control voltage to prevent a shift in the voltage level of the emitter electrode of said time gated transistor by increased conduction resulting from noise impulses accompanying the composite video signal applied to its base electrode; a noise cancelling transistor having emitter, base and collector electrodes; means coupling the emitter electrode of said noise cancelling transistor to said video amplification means to derive a composite video signal of a polarity opposite to said given polarity therefrom; means connected to the base electrode of said noise cancelling transistor to bias the same to cutoff in the presence of said composite video signal unaccompanied by noise impulses of a predetermined level, with noise impulses exceeding said predetermined level causing conduction of said noise cancelling transistor; and means connecting the collector electrode of said noise cancelling transistor to the collector electrode of said time gated transistor, with conduction of said noise cancelling transistor causing the level of the collector electrode of said time gated transistor to be reduced to the level of its emitter electrode, whereby conduction of the collector-to-base diode of said time gated transistor causes cancellation of noise impulses at the base electrode thereof.

8. In a transistorized television receiver for television signals which include a video signal component and a synchronizing signal component of an amplitude exceeding the peak amplitude of the video signal component, the combination including: video detector circuit means for providing a detected composite video signal of a given polarity, which composite video signal may contain noise impulses of the same polarity; video amplification means including at least one transistor amplifier stage for coupling said composite video signal to utilization means; an NPN time gated transistor having base, collector and emitter electrodes, with the base electrode of said time gated transistor coupled to said video amplification means to derive a composite video signal of a positive going polarity therefrom; means for developing voltage pulses at the horizontal sweep rate of said receiver; means including a capacitor in parallel with a resistor for coupling said voltage pulses to the collector electrode of said time gated transistor, with the conduction of said time gated transistor being controlled by the level of the synchronizing signal component of said composite video signal, means coupled to the emitter electrode of said time gated transistor for developing an automatic gain control voltage in response to conduction thereof, with said parallel resistance-capacitance network providing a D.C. voltage of a polarity to prevent a shift in the D.C. level of the emitter electrode of said time gated transistor resulting from increased collector-to-emitter leakage conduction as the consequence of noise impulses accompanying the composite video signal supplied to its base electrode; a noise cancelling transistor having emitter, base and collector electrodes; means coupling the emitter electrode of said noise cancelling transistor to said video amplification means to derive a composite video signal of a negative going polarity therefrom; means connected to the base electrode of said noise cancelling transistor to bias the same to cutoff in the presence of said composite video signal, with said noise cancelling transistor being caused to conduct by accompanying noise impulses exceeding a predetermined level; and means connecting the collector electrode of said noise cancelling transistor to the collector electrode of said time gated transistor, whereby noise impulses exceeding said predetermined level are cancelled from the base electrode of said time gated transistor.

No references cited.

DAVID G. REDINBAUGH, *Primary Examiner.*